(12) United States Patent  
Walter et al.

(10) Patent No.: US 8,825,630 B2
(45) Date of Patent: Sep. 2, 2014

(54) METHOD AND SYSTEM FOR GENERIC ENTERPRISE SEARCH ADAPTER QUERIES

(75) Inventors: Wolfgang Walter, Heidelberg (DE); Stephan Toebben, Walldorf (DE)

(73) Assignee: SAP AG, Walldorf (DE)

( * ) Notice: Subject to any disclaimer, the term of this patent is extended or adjusted under 35 U.S.C. 154(b) by 17 days.

(21) Appl. No.: 13/206,426

(22) Filed: Aug. 9, 2011

(65) Prior Publication Data

US 2013/0041880 A1  Feb. 14, 2013

(51) Int. Cl.
*G06F 7/00* (2006.01)
*G06F 17/30* (2006.01)

(52) U.S. Cl.
CPC .................................. *G06F 17/30893* (2013.01)
USPC .......................................................... 707/713

(58) Field of Classification Search
USPC .......................................................... 707/713
See application file for complete search history.

(56) References Cited

U.S. PATENT DOCUMENTS

| | | | |
|---|---|---|---|
| 2005/0154722 A1* | 7/2005 | Seitz et al. | 707/3 |
| 2007/0226242 A1* | 9/2007 | Wang et al. | 707/102 |
| 2010/0057702 A1* | 3/2010 | Ghosh et al. | 707/4 |
| 2011/0179110 A1* | 7/2011 | Soloway | 709/203 |

* cited by examiner

*Primary Examiner* — Truong Vo (74) *Attorney, Agent, or Firm* — Buckley, Maschoff & Talwalkar LLC (57) ABSTRACT

According to some embodiments, a method and system provides receiving a request to execute a query for a business object (BO) instance for an application, the request including selection criteria; determining whether to execute the query by the application or a separate search engine, the determining based on metadata associated with the BO instance; sending the selection criteria to the search engine to execute the query in response to the determination that the query is to be executed by the search engine; receiving a result of the query execution from the search engine; and providing an output of the query result.

18 Claims, 6 Drawing Sheets

| STRUCTURE NAME | ENHANCEMENT CAT. | COMPONENT | REF. | COMPONENT TYPE |
|---|---|---|---|---|
| /PLMB/S_SPI_ES_QUERY | CANNOT BE ENHANCED | QUERY_NAME | | /PLMB/SPI_QUERY_NAME |
| | | DEFINITION | | /PLMB/SPI_ES_DEFINITION |
| | | NODE_ID_MAPPING | | /PLMB/SPI_ES_ATTR_MAP |
| /PLMB/S_SPI_ES_DEFINITION | CANNOT BE ENHANCED | TEMPLATE_ID | | ESH_E_IF_TEMPLATE_ID |
| | | RELATION_TYPE | | ESH_E_IF_RELATION_TYPE |
| | | REQUEST_TYPE_ID | | ESH_E_IF_CON_REQUEST_TYPE_ID |

METHOD AND SYSTEM FOR GENERIC ENTERPRISE SEARCH ADAPTER QUERIES

FIELD

Some embodiments generally relate to executing queries. More specifically, some embodiments provide a method and system for leveraging search capabilities of an enterprise search by a separate application using a query adapter.

BACKGROUND

Enterprise search solutions, including systems having enterprise search engines to provide access to data that may be located in different systems, in different formats, and provided by and from different data sources, may provide unified search access and enablement to an enterprise and users thereof. SAP® provides an enterprise search service, SAP NetWeaver Enterprise Search® (ES) that provides fast search capabilities to structured and unstructured data, including business data and third party data. ES provides fast data queries based, in part, on an extensive and thorough modeling and indexing of data structures. As such, ES and other enterprise search engines may stand apart from other applications and services that, while offering some query or search functionality built into the application or service, is not as unified and fast as that provided by an enterprise search engine.

Accordingly, a method and mechanism for efficiently leveraging aspects of an enterprise search engine may be provided by some embodiments herein.

DETAILED DESCRIPTION

Figure 1:
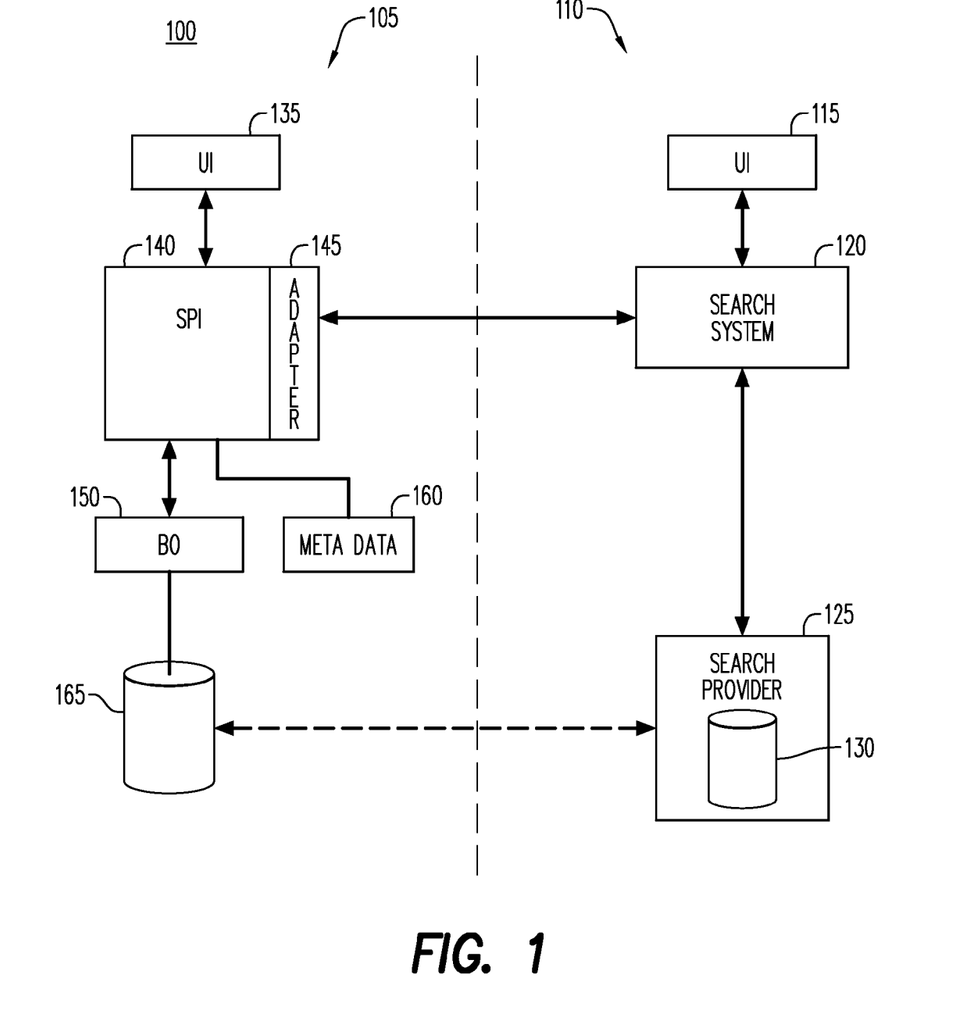
FIG. 1 is a block diagram of a system environment according to some embodiments.

FIG. 1 is an illustrative block diagram of a system environment 100 according to some embodiments. System environment 100 will be used to introduce aspects of various embodiments of the present disclosure, as well as provide a context for processes related thereto. It is noted however that processes and systems of the present disclosure are not limited to a system environment such as that specifically depicted in FIG. 1. In some embodiments, different, alternate, or substitute systems may be applicable to the embodiments herein, including systems with more, fewer, and different components.

As illustrated, system environment 100 includes an application 105 and a search service or generally, a search engine, 110. In some embodiments, search engine 110 includes a user interface 115 that allows a user to enter query search selections and other criteria. User interface 115 communicates with search system 120, such as but not limited to SAP NetWeaver Enterprise Search® (ES) provided by SAP®. ES is an enterprise search engine that can index and search across structured and unstructured data sources, including business objects (BOs), objects. In some embodiments, search engine 120 may extensively index data, including BOs and other data, from search provider 125 and be supported by access to one or more database systems 130. Search system 120 may provide model searches to allow querying of data with a wide range of query conditions and criteria. In some instances, search provider 125 may include SAP TREX, but is not limited thereto and may be extended to additional sources including search service providers and search data providers. In some embodiments search engine 110 may provide a powerful and fast search solution including data integration for an enterprise in a centralized manner.

In some embodiments, application 105 may be provided as part of an integrated group of business applications such as SAP Business Suite® provided by SAP®. SAP Business Suite® is built on a framework that may be used by a wide variety of applications. As such, enhancements that may be provided to that framework may be re-used by the variety of applications supported by that framework. In some embodiments, application 105 may comprise SAP ERP, an enterprise resource planning application, although other applications may be supported including those now existing and those that may be developed. As illustrated in FIG. 1, application 105 includes a user interface 135 (optional), a data access layer 140 (e.g., Service Provider Infrastructure, SPI) that provides access between the user interface 135 and the business logic of business objects definition (BO) 150 and their associated metadata 160. The business logic is supported by and has access to a database layer 165 for the data (i.e., BO instances) related to the application (e.g., an ERP database).

As used herein, a business object, in one aspect, is a data structure. As an example, a BO "MATERIAL" may have fields with attributes such as "vendor", "price", "unit to indicate a quantity", etc.; and the BO "PURCHASE ORDER" may have fields with attributes such as "ID", "vendor", "quantity of material", "delivery time frame", etc., with metadata associated with each BO describing the attribute fields. Accordingly, BO definition 150 and associated metadata 160 comprises BO data structures.

In some aspects, a business object refers to a particular data set according to a data structure (i.e., an instance of the BO data structure). As an example, a particular instance of the PURCHASE ORDER may have a particular ID number ("1357"), a quantity of units of goods/services ("1000 units"), a time frame ("May to July 2011"), etc. FIG. 1 illustrates particular instances of BOs (i.e., the BO data) persisted at 165 and 130.

In some aspects, data access layer 140 may offer a query method such that a consumer at user interface 135 and providing input of selection criteria and other options may have a query of node models, BOs definition 150, executed within the application. In some embodiments, querying of the BOs may be limited by the definitions of metadata 160 that were created at a design time of the development of the application 105. In some instances, the definitions of metadata 160 may be limited to certain attributes and operations of BOs 150. Metadata 160 may include an application specific query method. Accordingly, whereas the framework of application 105 may allow an application specific query of data (e.g., BO instances 165) for a BO definition 150, the application query method may be limited as compared to the query functionality offered by the separate search engine 110 that is optimized to provide search capabilities to all data in an integrated manner. In some embodiments, since a vast majority of the BO's 150 are indexed by the enterprise search provider 125, there is no need for a direct connection between the database layer of application 105 and the search engine 110. In some aspects, changes to BOs 150 and their associated metadata 160 as persisted at database 165 may be provided to search provider 125 and indexed or persisted at database 130, as needed in response to changes of data at database layer 165.

Some embodiments provide the data access layer 140 supporting application 105 with an adapter 145. Adapter 145 may allow a consumer at UI 135 to query any and all of the BO node models 150 as supported by search engine 110 from within application 105 using the search capabilities of search engine 110. Given search engine 110 may extensively index the node models, including all of the attributes and operations modeled thereby (e.g., queries defined for the node models), adapter 145 may allow application 105 to leverage the search features and capabilities of search engine 110.

Figure 2:
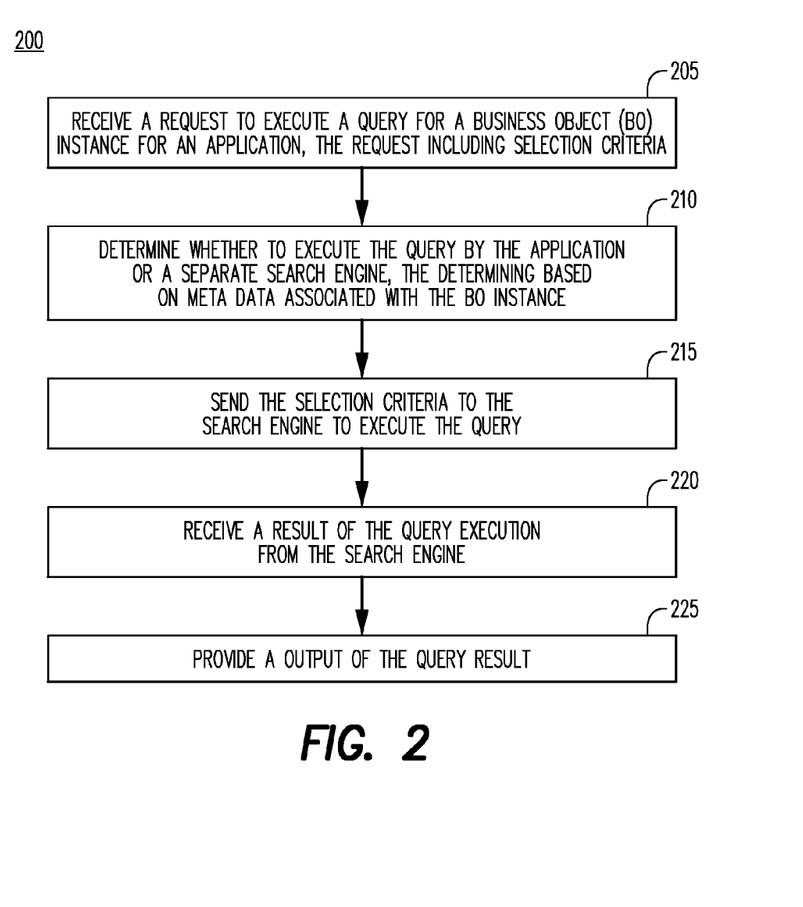
FIG. 2 is a depiction of a flow diagram in accordance with some embodiments.

FIG. 2 is an illustrative flow diagram of a process 200 to provide a search adapter, in some embodiments herein. Process 200 will be discussed in the context of system environment 100, although other system environments may be used to instrument aspects of process 200. At operation 205, a request to execute a query for a BO instance is received by application 105. The query request may include selection criteria for the query, specifying for example a BO instance to be queried and query parameter values.

At operation 210, a determination may be made whether to execute the query by application 105 or search system 120. The determination of whether the query is to be performed by application 105 or search system 120 may be based on the metadata associated with the BO instance referenced in the search query. The metadata may describe the BO instance, including a name for the BO instance, what queries methods (if any) are provided for the BO instance, a data type result of the provided query method(s), and other attributes and operations. In some aspects the metadata associated with the BO instance, such as the name of the BO instance, may cause access layer 140 to reference a table or other data structure that includes specifics regarding the attributes and operations (e.g., query methods) for the BO instance. In some aspects, the particular query method defined for the BO instance and referenced in the metadata modeling of the BO instance may indicate whether the query method of the BO instance is an application specific query method to be performed by application 105 or whether the query method is to be instrumented by a separate and distinct search engine, such as but not limited to search system 120. By defining the metadata 160 to include an indication of the type of query method to provide for BOs 150 at a design time, the data access layer 140 may determine what query type is to be executed at a run time at operation 210.

At operation 215, based on the determination of operation 210 that the query is to be executed by the search engine, the selection criteria provided with the query request is sent to search system 120 for execution. Search system 120, in response to being sent the selection criteria, may execute the query using a modeled query method associated with the BO of the query request. The execution of the query by search system 120 is performed independent of application 105. Search results of the query execution are received by adapter 145 from search system 120 at operation 220.

At operation 225, the search results may be presented to a consumer as an output of UI 135. It is noted that the query result may be provided in one or more different forms. For example, the output of the query result may be provided as a data file for consumption by a software application or service, as a hard copy printed report, as a log entry, as part of a message communicated to a system or device, etc.

As demonstrated, process 200 provides a method for an application to leverage and (re-)use search capabilities of a search engine separate and distinct from the application itself. In some aspects an adapter 145 may be implemented to provide an interface between the framework of application 105 and the search engine 110.

In some aspects, only a minimal amount of information need be provided by adapter 145 in order for search engine 110 to execute the requested query. A minimum amount of data may be required since the BO instance of the requested query has been fully modeled and indexed as part of the enablement of search system 110. In some embodiments, the existing metadata definition of access layer 140 may be enhanced to support queries, namely generic query adapters. The access layer metadata definition may be enhanced to support metadata queries by enhancing the definition of the supported queries (e.g., application specific queries, search engine queries (e.g., a ES executed query), and a general application "help" search) and by enhancing the definition of the query attributes (e.g., search criteria, result attributes) for the supported queries.

In some aspects, an adapter for instrumenting search engine searches may be designed to allow generic coding for the search adapter by using a query type specific metadata definition that follows a common definition approach. The definition structure for a table of (query type specific) queries includes a first field query name (that is also the unique key of the table) and a named include "DEFINITION" that contains the query type specific metadata information. Based on the included name, the access data layer 140 may access and forward the metadata without having to know the type of the data structure. In some embodiments, query names are contained within one node. The data access layer 140 may ensure this aspect through an ASSERT statement, since the query names are distributed across query type specific tables and therefore uniqueness cannot be ensured solely by table definition (sorted, unique, etc.)

Figure 3:
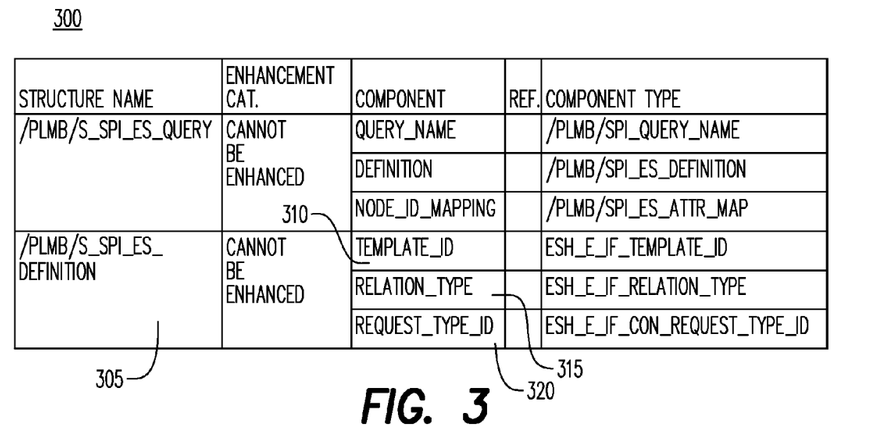
FIG. 3 is an illustration of a data table in accordance with some embodiments.

FIG. 3 provides an illustrative depiction of a data structure containing the relevant (e.g., minimum) fields that may be needed for defining an enterprise search query in some embodiments. That is, a query to be executed by search engine 110 based on a call from adapter 145 of the access layer 140 of application 105 may be enabled by providing the information of fields 310, 315, and 320 of DEFINITION 305. The values for fields 310, 315, and 320 may, in some embodiments, include all of the information required from an application's point of view to enable a node for a generic enterprise search query.

The three fields TEMPLATE_ID 310, RELATION_TYPE 315, and REQUEST_TYPE_ID 320 may be referred to as the "key" fields to uniquely identify a search engine query (e.g., an ES) definition/implementation. Here follows an example how the fields 310, 315, and 320 may be populated to enable a search engine query for a "Material" data access node for the search engine (e.g., ES) query:

Is_query-definition-
  template_id='PLMWUI~STANDARD~MATERIAL~'.
Is_query-definition-request_type_id='PLM'.
Is_query-definition-relation_type=space.

To provide an indication of which query shall be executed by access layer 140, the QUERY method of a data model (e.g., a BO data structure) may be extended with the new parameter (e.g., IV_QUERY_NAME).

To provide generic support of a search engine query, an adapter class is used in some embodiments that extracts the metadata from a search engine and converts it into a format that can be consumed by the access layer; and executes the query using the search engine based on parameters given in the access layer.

In some aspects, to avoid query type specific coding in the access layer, a factory approach may be used wherein different query adapters may be chosen to implement different type of queries, with each query adapter including the coding needed for that specific type of query. Based on the query type indicated by a query name, the query factory class may return a query adapter interface instance that is used to read metadata and execute the appropriate query.

In some embodiments, mapping of query result attributes and parameters is task of the adapter implementation. For this aspect, the data access layer 140 may forward the mapping information of the metadata definition to each query call of an adapter.

Figure 4:
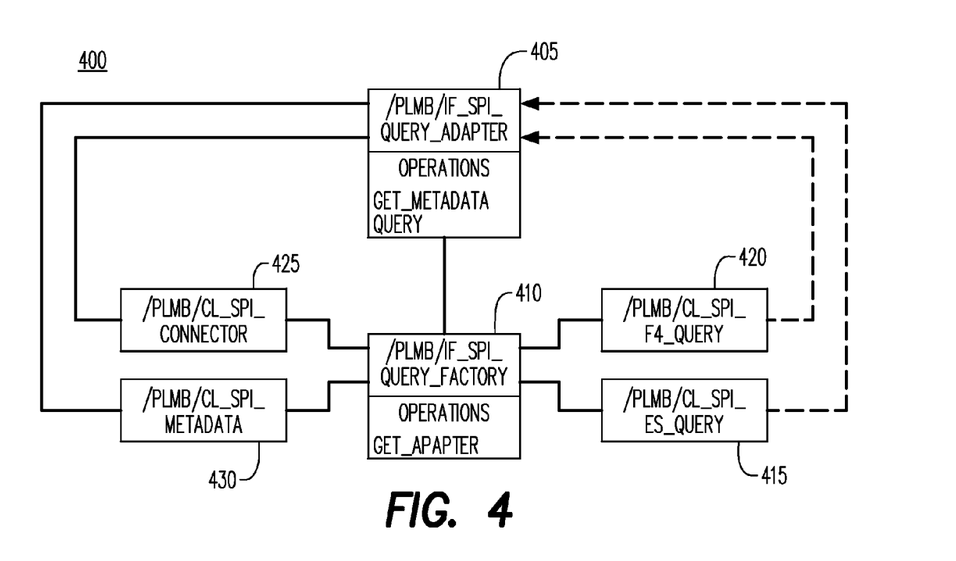
FIG. 4 is an illustration of a queue factory in accordance with some embodiments.

FIG. 4 is an illustrative depiction of a class diagram 400 showing how adapter instances may be created by a central factory class. FIG. 4 shows how adapter 145 of data access layer 140 may provide an infrastructure for integrating generic query adapters, in some embodiments. Query adapter class 405 is defined to contain two methods, (1) a method for retrieving query metadata in a format accepted by the access layer (e.g., GET_METADATA method), and (2) a method to instrument the execution of the query (e.g., QUERY method). The method to retrieve the metadata gathers the metadata so that a determination may be made regarding what types off queries are possible, that is, supported by the BO. This method may be used in determining what types of queries are presented to a consumer as query options via UI 135 regarding a query for a particular BO. The metadata may be requested from an adapter implementation. Based on metadata, query factory 410 will be able to determine which query adapter, 415 or 420, is relevant to a particular query request. The query factory 410 will call the appropriate query adapter 415 or 420 for implementing method (1) or (2) of query adaptor 405.

Regarding the provisioning of metadata by the query adapter 405, the adapter provides metadata information in the format accepted by the data access layer 140. Data access layer 140 supplies, at runtime, the required (i.e., minimum) search engine information such as the three (3) identifiers discussed above with respect to FIG. 3 that are provided by the access layer of application 105. With these identifiers adapter 145 calls interfaces of search system 120 and retrieves the search engine metadata information for the queried object using class 430. The retrieved metadata is converted into the format of the data access layer and returned as export parameter to the access layer. By implementing the provisioning of metadata in this manner, no application coding and logic may be required of application 105.

Regarding the execution of a query as enabled by the method of query adapter 405, a query triggered by a consumer of access layer 140 that is identified as a search engine query (e.g., an ES search) causes the access layer to call the adapter class with the query parameters (e.g. selection criteria) in the format of the access layer. Accordingly, the adapter may map the selection criteria information into a format accepted by the search system 120, call the respective search system interfaces, and upon receipt of the search result information from the search system, map the result information into the accepted access layer format. By implementing the execution of the metadata in this manner, no application coding and logic may be required of application 105.

FIG. 4 further illustrates an aspect of some embodiments where query factory 410 may call upon one or more query adapters 415 and 420. In the example of FIG. 4, query adapter 415 provides a query executed by search engine 110, whereas query adapter 420 provides an application specific "help" search.

Figure 5:
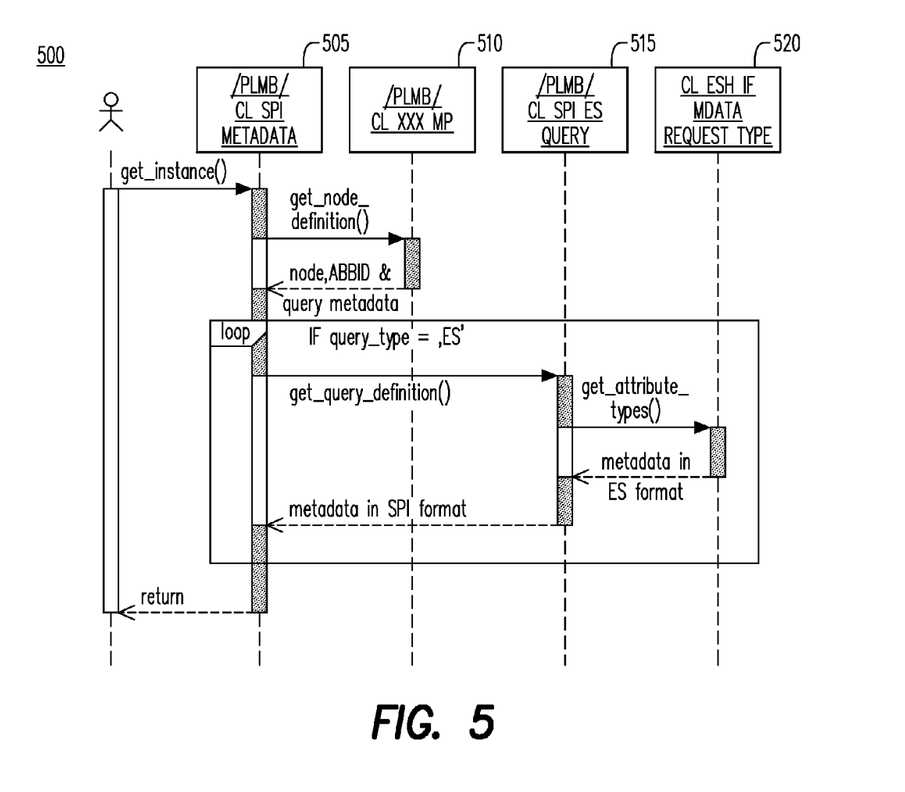
FIG. 5 illustrates a sequence diagram according to some embodiments.
Figure 6:
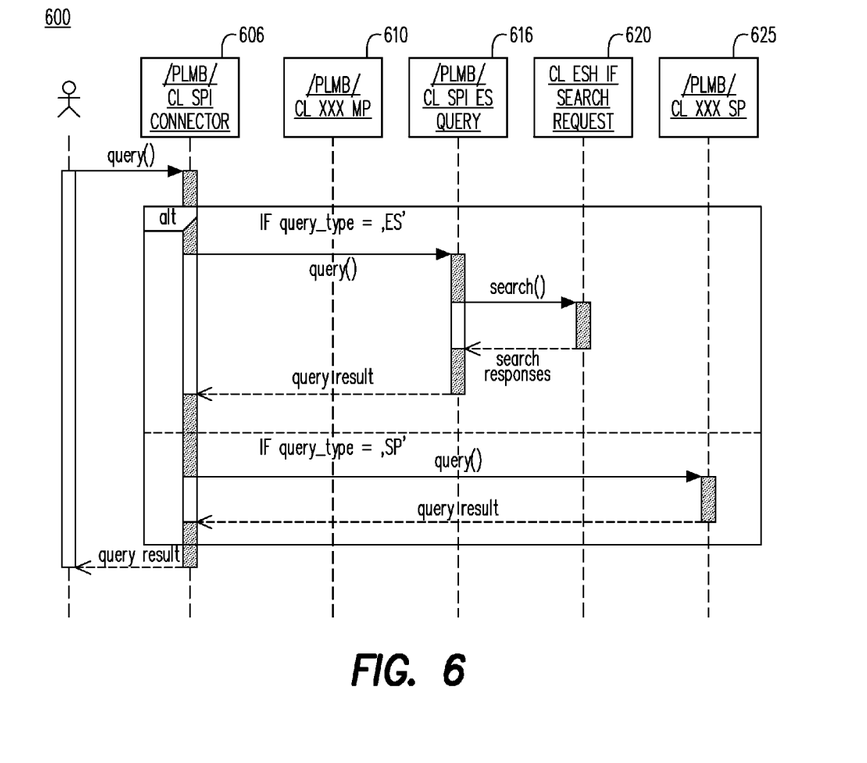
FIG. 6 illustrates another sequence diagram according to some embodiments.

FIGS. 5 and 6 are illustrations of sequence diagrams, depicting a sequence of operations that may be used to implement aspects of some processes herein. Sequence diagram 500 illustrates how search engine metadata may be extracted to an access layer, and sequence diagram 600 illustrates how a search engine may execute a query for a data access layer and return the results of the query execution to the data access layer. It is noted that for the sequence diagrams of FIG. 6 and FIG. 7, an adapter class may be accessed by an access layer via an adapter interface provided by a factory class.

Referring to the sequence of operations depicted in sequence diagrams 500 and 600, it is noted that classes 505 (i.e., /PLMB/CL_SPI_METADATA) and 605 (i.e., /PLMB/CL_SPI_CONNECTOR) belong to the data access layer. Class 510/610 (i.e., /PLMB/CL_XXX_MP) is an application specific metadata implementation, for example an ABAP object-oriented class for which the application's node model is described (e.g., node names, typization, query names, etc.). Herein, class 515/615 (i.e., /PLMB/CL_SPI_ES_QUERY) is the query adapter for the particular search engine (e.g., search system 120) of the present example. The "CL_ESH_ . . . " objects belong to the search engine, where class 520 (i.e., CL_ESH_IF_MDATA_REQUEST_TYPE) is the interface of the search engine to extract the metadata information and class 620 (i.e., CL_ESH_IF_SEARCH_REQUEST) is the search engine interface to execute a search engine query.

As shown, a number of classes 505, 510, 515, and 520 may be used to perform the tasks associated with performing the process of extracting search engine metadata to the access data layer. In the examples of FIGS. 5, and 6 the classes used in the depiction thereof may be the same as the BO classes introduced in FIG. 4. In some embodiments the classes may differ from those specifically illustrated in the example of FIG. 4.

Sequence diagram 500 illustrates how the data access layer handles queries concerning metadata when the data access layer 505 (/PLMB/CL_SPI_METADATA) is accessed. The data access layer reads the metadata from the application specific metadata provider 510 (i.e., /PLMB/CL_XXX_MP) by requesting the definitions for the node model. As an example, the class name of a BO may be "Material" and be represented as CL_METADATA_MATERIAL. The data access layer 505 receives the metadata and evaluates it to determine the type of the query associated therewith. In the event the application 105 has defined any search engine 110 queries (e.g., an ES search), the data access layer 505 may, via search engine adapter 515, get the search engine key fields from the metadata definition and further call the search engine metadata interface 520 (i.e., CLESH_IF_MDATA_REQUEST_TYPE) with the key information. With the call to the search engine, the data access layer requests all of the relevant metadata information concerning the query from the search engine. The relevant query metadata information may include available search criteria and response attributes, that may define, for example, which fields of the query object can be searched and what field/attribute information will be returned as a result. This metadata is returned from the search engine in the format of the search engine and may be converted by query adapter 515 into a standardized access data layer format. Furthermore, the returned metadata may be provided to a consumer at UI 135 in the form of options for executing a query for a BO instance.

In some embodiments, sequence diagram 500 may be optional from a consumer's point of view and the consumer may have a search engine query directly executed without a need to be informed of the query options based on an extraction of metadata from a search engine. For example, the consumer may already have the knowledge of the query options associated with a particular BO query.

FIG. 6 provides an illustration of how the data access layer 140 may handle queries at a runtime. Based on the received query name in the query method, the data access layer identifies, internally, at 605 whether the requested query is a search engine related query or whether it is an application specific query that is to be handled by application 105 itself. In the instance the query is a search engine type query, FIG. 6 shows that the query adapter 615 of the data access layer calls the search engine interface 620 to execute the query. Furthermore, query adapter 615 may first convert the search parameters (e.g. search criteria) provided by the consumer into the format of the search engine before supplying the search criteria to the search engine in a call to the search engine at 620 to have the query executed. Also, query adapter 615 may convert the query result into the format of the data access layer and further return the query result to the consumer of application 105 via UI 135.

In some embodiments, processes herein may be implemented without requiring a change to the search engine called upon to execute a query by an application. For example, application 105 may appear to be a "consumer" of the search functions provided by search engine 110, based on the enhanced metadata model information of some embodiments.

Figure 7:
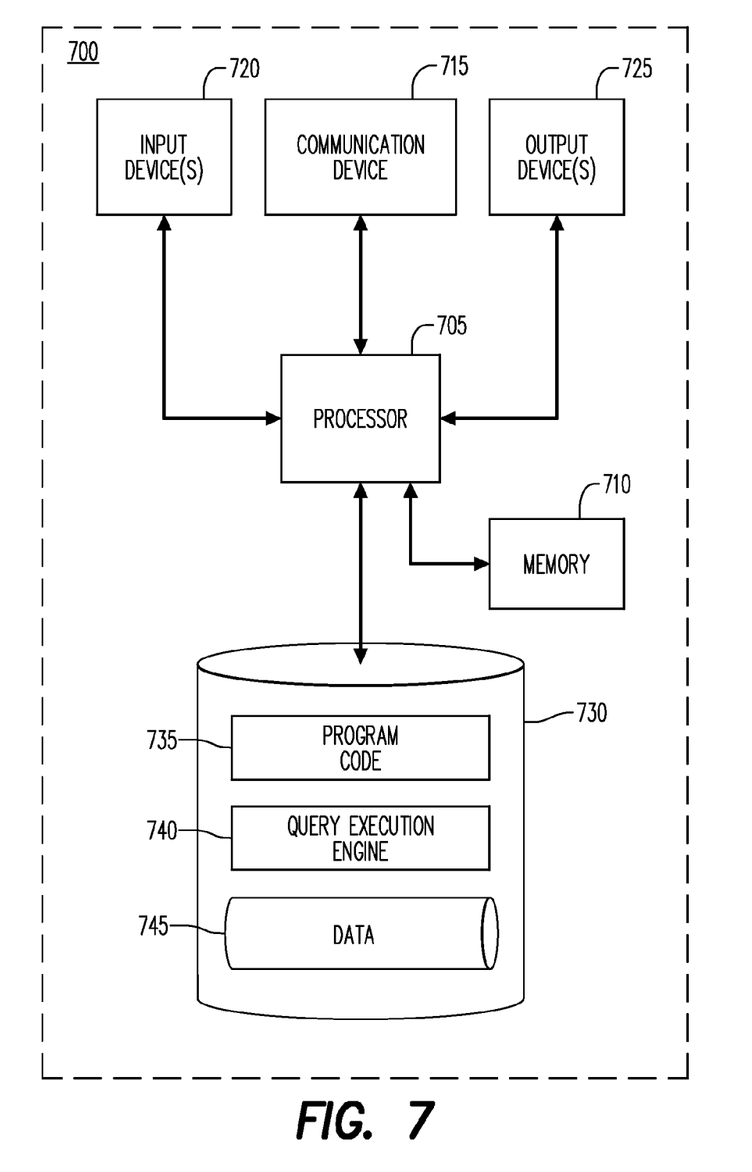
FIG. 7 is a block diagram of a system according to some embodiments.

FIG. 7 is a block diagram overview of a system or apparatus 700 according to some embodiments. System 700 may be, for example, associated with any of the devices described herein, including for example a device or system to implement aspects of application 105 and search engine 110, including an application server supporting one or both. System 700 comprises a processor 705, such as one or more commercially available Central Processing Units (CPUs) in the form of one-chip microprocessors or a multi-core processor, coupled to a communication device 715 configured to communicate via a communication network (not shown in FIG. 7) to another device or system. In the instance system 700 comprises an application server, communication device 715 may provide a means for system 700 to interface with a client device (e.g., client 105). System 700 may also include a local memory 710, such as RAM memory modules. The system 700 further includes an input device 720 (e.g., a touch screen, mouse and/or keyboard to enter content) and an output device 725 (e.g., a computer monitor to display a user interface element).

Processor 705 communicates with a storage device 730. Storage device 730 may comprise any appropriate information storage device, including combinations of magnetic storage devices (e.g., a hard disk drive), optical storage devices, and/or semiconductor memory devices. In some embodiments, storage device may comprise a database system.

Storage device 730 stores a program code 735 that may provide computer executable instructions for processing requests from, for example, client devices in accordance with processes herein. Processor 705 may perform the instructions of the program 735 to thereby operate in accordance with any of the embodiments described herein. Program code 735 may be stored in a compressed, uncompiled and/or encrypted format. Program code 735 may furthermore include other program elements, such as an operating system, a database management system, and/or device drivers used by the processor 705 to interface with, for example, peripheral devices. Storage device 730 may also include data 740. Data 740 may be used by system 700, in some aspects, in performing the processes herein, such as process 400.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method for executing a query, the method comprising:
receiving, by an application having a first user interface, a request to execute a query by the application, the request including selection criteria for the query that includes a business object (BO) instance to be queried;
determining whether to execute the query by the application or a search engine having a second user interface that is separate and distinct from the application that executes queries independent of the application, the determining based on metadata associated with the BO instance referenced in the request to execute the query, the metadata including an indication of a type of query method to provide for the BO instance;
sending the selection criteria to the search engine to execute the query in response to the determination that the query is to be executed by the search engine;
receiving, by the application, a result of the query execution from the search engine; and
providing an output of the query result.

2. The method of claim 1, wherein the selection criteria includes a name identifying the query and the determining is based on metadata associated with the BO, as identified with the name.

3. The method of claim 1, further comprising:
converting the selection criteria into a format accepted by the search engine; and
converting the result of the query execution into a format accepted by the application.

4. The method of claim 1, further comprising:
providing the selection criteria to an application specific query operation to execute the query in response to the determination that the request to execute the query is to be provided by the application; and
receiving a result of the query execution from the application specific query operation.

5. The method of claim 1, further comprising providing the metadata attributes associated with the at least one query to be executed by the search engine to a user interface.

6. The method of claim 1, wherein the search engine is an enterprise search system.

7. A system comprising:
a processor;
a database; and
a memory coupled to the processor and the database, the memory storing instructions executable by the processor to:

receive a request to execute, by an application, a query for a business object (BO) instance, the application having a first user interface and the request including selection criteria;

determine whether to execute the query by the application or a search engine having a second user interface that is separate and distinct from the application that executes queries independent of the application, the determining based on metadata associated with the BO instance referenced in the request to execute the query, the metadata including an indication of a type of query method to provide for the BO instance;

send the selection criteria to the search engine to execute the query in response to the determination that the query is to be executed by the search engine;

receive, by the application, a result of the query execution from the search engine; and provide an output of the query result.

8. The system of claim 7, wherein the selection criteria includes a name identifying the query and the determining is based on metadata associated with the BO instance, as identified with the name.

9. The system of claim 7, further comprising the memory storing instructions executable by the processor to:

convert the selection criteria into a format accepted by the search engine; and convert the result of the query execution into a format accepted by the application.

10. The system of claim 7, further comprising the memory storing instructions executable by the processor to:

provide the selection criteria to an application specific query operation to execute the query in response to the determination that the request to execute the query is to be provided by the application; and receive a result of the query execution from the application specific query operation.

11. The system of claim 7, further comprising providing the metadata attributes associated with the at least one query to be executed by the search engine to a user interface.

12. The system of claim 7, wherein the search engine is an enterprise search system.

13. A non-transitory medium having processor-executable instructions stored thereon, the medium comprising:

instructions to receive a request to execute a query by an application for a business object (BO) instance, the application having a first user interface and the request including selection criteria;

instructions to determine whether to execute the query by the application or a search engine having a second user interface that is separate and distinct from the application that executes queries independent of the application, the determining based on metadata associated with the BO instance referenced in the request to execute the query, the metadata including an indication of a type of query method to provide for the BO instance;

instructions to send the selection criteria to the search engine to execute the query in response to the determination that the query is to be executed by the search engine;

instructions to receive, by the application, a result of the query execution from the search engine; and instructions to provide an output of the query result.

14. The medium of claim 13, wherein the selection criteria includes a name identifying the query and the determining is based on metadata associated with the BO instance, as identified with the name.

15. The medium of claim 13, further comprising:

instructions to convert the selection criteria into a format accepted by the search engine; and instructions to convert the result of the query execution into a format accepted by the application.

16. The medium of claim 13, further comprising:

instructions to provide the selection criteria to an application specific query operation to execute the query in response to the determination that the request to execute the query is to be provided by the application; and instructions to receive a result of the query execution from the application specific query operation.

17. The medium of claim 13, further comprising instructions to provide the metadata attributes associated with the at least one query to be executed by the search engine to a user interface.

18. The medium of claim 13, wherein the search engine is an enterprise search system.

\* \* \* \* \*